Patented July 29, 1941

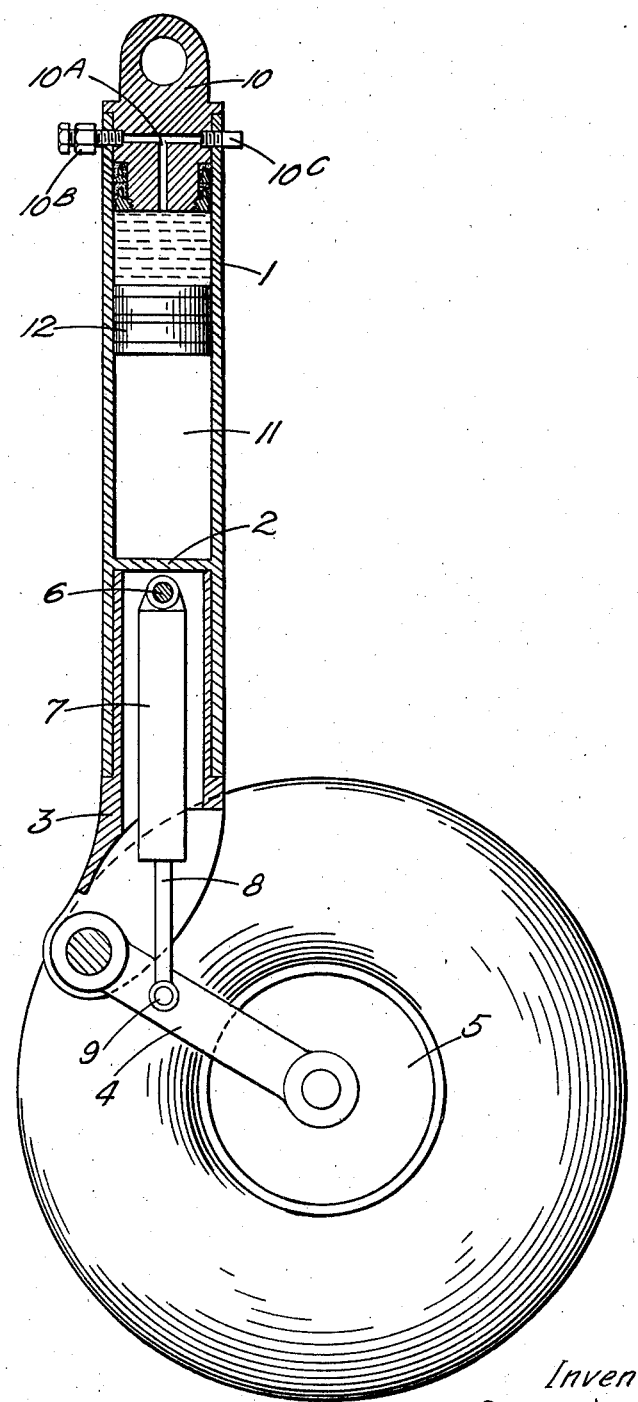

2,251,239

UNITED STATES PATENT OFFICE 2,251,239

UNDERCARRIAGE AND PRESSURE RESERVOIR OF AIRCRAFT

George Herbert Dowty, Cheltenham, England

Application October 12, 1939, Serial No. 299,201
In Great Britain September 17, 1938

2 Claims. (Cl. 244—104)

This invention relates to undercarriages of aircraft and containers or reservoirs for fluid, or pressure accumulators, such as may be used in systems for operating auxiliaries in aircraft, e. g. flaps, retraction gear, and so on. In some such systems whether they be essentially hydraulic or pneumatic, or a combination of both, there is often provided a pressure accumulator or pressure reservoir. This is a relatively heavy, cumbrous, component for which it may be difficut to provide stowage space and the weight of which, in any case, it is desirable to avoid. On the other hand an undercarriage leg, i. e. that member of a landing gear which transmits the main loads between the aircraft and a landing element such as a wheel, (usually in compression or compression and bending) especially if of the cantilever or some-cantilever type, is also necessarily heavy and strong and usually tubular. Putting the underlying idea of the present invention in simple terms, it consists in making the structure of the leg do duty as the cylinder, bottle, or chamber, for containing fluid, either as a reservoir simply in the sense of a container, or as a pressure-reservoir, or accumulator, so that two somewhat heavy components of the aircraft are combined in one.

The present invention consists primarily in forming a rigid undercarriage leg or a rigid part of such a leg as a fluid container. It is obvious that a plurality of legs may be so constituted, the containers formed then being mutually or separately connected with the system in which they are to operate. The invention therefore includes the provision of a fluid-pressure system having such pump, valve, and jack or other motor arrangements, as are required, together with the necessary pipes and conduits, and one or more reservoirs, or accumulators formed of and by one or more undercarriage legs, which to that end are hollow, fluid-pressure tight, and provided with the connections, relief-valves, idle piston, etc., such as an air-bottle or like reservoir or a pressure accumulator would ordinarily have. The invention may find particular application in undercarriage legs of the non-telescopic nature, which are in the nature of a substantially rigid tubular support-member carrying an internally or otherwise sprung wheel at its extremity.

It is well known to form an undercarriage leg of a telescopic arrangement of tubular parts, one or more of which are pressure containers in the sense that the leg as a whole is a telescopic shock absorber relying on fluid-pressure for its action, and the pressure fluid is contained in such part or parts. In the present case, however, when I speak of a fluid container, pressure reservoir, or pressure accumulator, I do not mean one which is concerned with the shock-absorber action of a telescopic or shock-absorbing leg, in which the pressure is dependent on the load in the leg and is operative to resist such load, but I am concerned with legs which, so far as the objects and applications of the invention are concerned, are rigid non-yielding undercarriage members (though there is no reason why some part of a leg as a whole, should not yield); and with pressure containers which are not involved in any shock-absorbing properties of the leg.

The invention includes legs as component parts; and aircraft having such legs and having fluid-pressure systems requiring a fluid container.

I wish it to be clearly understood in the claims that I do not claim a leg in which there is a pressure-space for the purposes of shock-absorber means associated with or comprised by the leg.

The invention will now be described by way of example, with the aid of the accompanying diagrammatic drawing, which is a part-sectional side elevation of a leg.

In the figure the leg itself comprises a cylindrical rigid tubular member 1, with a pressure-tight wall across its internal hollow, at 2. A fitting 3 at the bottom end carries a lever 4 supporting a landing-element shown as a wheel 5. Within the lower hollow of the leg, pivoted at 6, is a telescopic shock-absorber cylinder 7, the piston 8 of which is pivoted at 9 to the lever 4.

The upper end of the leg has a plug-fitting 10 for attachment to the aircraft and which forms a pressure-tight closure for the pressure container constituted by the hollow cylindrical space 11. In the fitting 10 is provided a duct 10A with three branches, one opening into the space 11, a second being closed by an inflation plug or valve 10B, and the third having a pipe connection 10C connecting the space 11 to the hydraulic system of the aircraft.

Within the space 11 may slide an idle piston 12 if it be required to use the space 11 as a pressure accumulator for the reception of pressure-liquid against the pressure of trapped compressed air.

It is to be understood that, according to this example of the invention, the aircraft to which the leg is fitted is deemed to have a hydraulic system to which the pipe 10C is connected for use of the space 11 as a pressure container.

What I claim is:

1. An aircraft landing gear comprising a hollow leg and a landing element carried thereby and upon which the aircraft is supported, a closure wall for one end of said leg, a closure wall extending transversely of the leg intermediate the ends thereof, whereby a fluid tight space is provided in one portion of the leg adapted to contain a fluid under pressure and an open ended space is provided in the remaining portion of the leg, a fluid inlet and a fluid outlet for said fluid tight space, whereby said fluid outlet may be connected to pressure operated mechanisms on the aircraft, a shock absorber mounted in said open ended space, a cantilevered arm pivotally mounted at one end on said leg and carrying said landing element on its opposite end, means pivotally mounting one end of said shock absorber below said intermediate wall to said hollow leg and means pivotally mounting the opposite end to said arm intermediate the ends thereof.

2. An aircraft landing gear comprising a hollow leg and a landing element carried thereby, said hollow leg having one end connected to said aircraft, a closure wall for one end of said leg, a closure wall extending transversely of the leg intermediate the ends thereof, whereby a fluid tight space is provided in one portion of the leg adapted to contain a fluid under pressure and an open ended space provided in the remaining portion of the leg, a fluid inlet and a fluid outlet for said fluid tight space, whereby said fluid outlet may be connected to pressure operated mechanisms on the aircraft, a shock absorber mounted in said open ended space, a cantilevered arm pivotally mounted on the lower end of said leg and carrying said landing element to permit movement thereof with respect to said leg, means pivotally mounting one end of said shock absorber below said intermediate wall to said hollow leg and means pivotally mounting the opposite end of said shock absorber to said cantilevered arm.

GEORGE HERBERT DOWTY.